Oct. 13, 1925.
H. D. STERRICK
HOSE AND FILTER HOLDER FOR DRAW OFF DEVICES
Filed Sept. 20, 1924
1,556,732
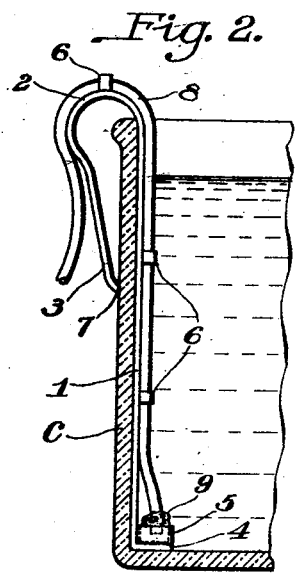
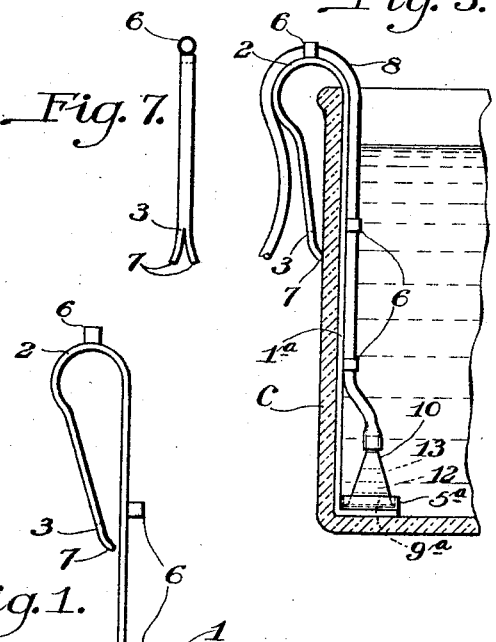
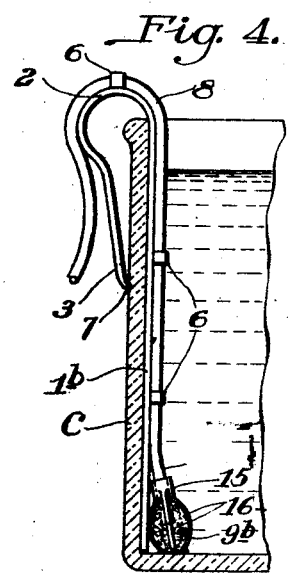
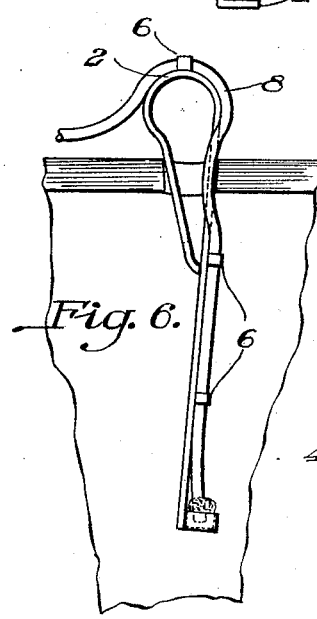
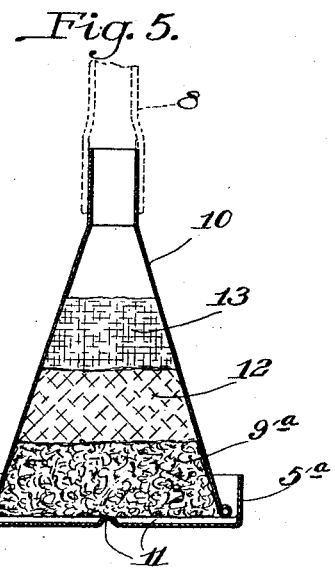
WITNESSESS
INVENTOR
Harrison D. Sterrick
by Winter, Brown & Critchlow
his attorneys Patented Oct. 13, 1925.

1,556,732

UNITED STATES PATENT OFFICE.

HARRISON D. STERRICK, OF PITTSBURGH, PENNSYLVANIA.

HOSE AND FILTER HOLDER FOR DRAW-OFF DEVICES.

Application filed September 20, 1924. Serial No. 738,800.

*To all whom it may concern:*

Be it known that I, HARRISON D. STERRICK, a citizen of the United States, and a resident of Pittsburgh, in the county of Allegheny and State of Pennsylvania, have invented a new and useful Improvement in Hose and Filter Holders for Draw-Off Devices, of which the following is a specification.

This invention relates to hose and filter holders for draw-off devices, intended to be used in racking off liquids, particularly home-made beverages, vinegar, etc., that have been fermenting, or settling.

The objects of the invention are to provide a device which will readily and firmly engage the side and edge of an open jar, or like receptacle, or the hole in a barrel, so as to maintain the device at any desired depth relative to the interior of the receptacle; to hold a hose securely supported by and on the device in fixed position without sharp bends that would impede flow of liquid therethrough; and to fix the relation of the inner end of the hose with respect to the bottom of the container. A further object is to provide means for holding a filter, such for instance as a small sponge over the open end of the hose inside the liquid.

Referring to the drawings, Fig. 1 is a side elevation of the filter-supporting device in unattached condition and without the hose; Fig. 2 is a side view, and partial vertical section through a jar, showing the holding device in operative position engaging the wall of the jar and holding a hose; Fig. 3 is a view similar to Fig. 1, showing a modified form of filter holder; Fig. 4 is a view similar to Fig. 2, showing another modified form of filter holder; Fig. 5 is an enlarged vertical section through the filter and its holder, as illustrated in Fig. 3; Fig. 6 shows the device as applied to a barrel or keg; and Fig. 7 is a partial rear elevation of the device as shown in Fig. 1.

In making certain forms of beverages, vinegar, etc., from fruit juices and the like, it is necessary that the liquid stand for a number of hours, or days, to permit fermentation to take place, for aging, settling, or for other purposes. Usually there results from such standing a foam or other form of scum on the top of the liquid, and a settlement of small particles to the bottom of the receptacle containing the liquid. If the receptacle be moved and the liquid poured off by tilting the receptacle, the scum and sediment mix with the liquid and can not be separated therefrom without further settlement. The practice for obtaining a clear liquid, separated from the scum at the top and the sediment at the bottom, is to draw off the liquid at some point intermediate the top and bottom thereof by means of a siphon. But, as the end of the siphon must be lowered practically to the upper limit of the sediment in the bottom of the receptacle in order to draw off all the liquid, there is ordinarily drawn through the siphon a material amount of sediment, towards the end of the drawing off operation.

I have found that a small sponge held over the intake end of the siphon will permit free flow of liquid therethrough, while at the same time separating out practically all of the scum. Other forms of material, such as wool, cotton, or the like may be used, with various degrees of separation and obstruction to the flow.

There has long existed a difficulty in firmly holding the end of a draw-off siphon at the proper elevation inside the liquid. If a loose rubber tube is used the end tends to move around in the liquid and if lowered too far will draw off sediment from the bottom. If not lowered enough, the liquid is drawn below it, and the flow is broken by intake of air, requiring refilling of the hose, with consequent annoyance and loss of time, as well as the danger of stirring up the sediment and requiring resettlement. Furthermore, if the rubber hose is merely bent over the edge of the jar and hangs freely, it has a tendency to flatten out or to take a sharp bend, thus obstructing or shutting off flow of liquid therethrough.

The present device, in combination with a suitable hose and filter, avoids all of the objections above stated.

It comprises a body member 1 composed preferably of metal, such as aluminum, or enameled or nickeled steel spring stock, bent into a large upper loop 2 with an outer terminal end 3 normally bearing against the main body member as illustrated in Fig. 1. At the other end the body member is preferably turned outward to form a supporting foot or extension 4, to which is attached a small cup-like member 5, as illustrated in Figs. 1 and 2. A number of circular loops 6 are attached to the body member 1, by any desired means, as for example by riveting, brazing, or the like. If the body is made of comparatively thin stock, as it may be, these loops may be formed by turning over integral tongues formed at the side of the body member. This, however, is ordinarily more expensive than the attachment of separate loops.

By comparing Fig. 1, which shows the device unattached and Fig. 2 which shows it in position upon a jar, or crock, it will be readily apparent how the resiliency of the body member itself is utilized to securely clamp the entire device upon the jar, in any desired position relative thereto. The outer end 3 of the spring body member has a transverse fork member 7, which is shaped so as to fit against the exterior of a jar or crock, for the purpose of giving a supporting contact of considerable extent.

A hose 8 is threaded through the loops 6, and is of the proper size to be engaged and retained thereby, while permitting easy removal of the hose when desired.

A sponge 9 is normally held by the small cup 5, at the foot of the clamping device, and the inner terminal of the hose is pressed down into this sponge, as clearly illustrated in Fig. 2. Consequently all of the liquid drawn up through the siphon must pass through the sponge 9 before reaching the tube itself. In certain cases where the sediment is heavy, or semi-solid, the sponge may be omitted. In that case the cup acts as a shield or guard and the liquid is drawn off from the inside, without a filter.

In Fig. 3 I have illustrated a modification in that instead of the sponge 9, a terminal cone member 10 is attached to the inner end of the hose 8. This cone seats in the cup 5ª, the bottom of which has transverse ribs 11, 11, so as to hold the edges of the cone 10 spaced from the bottom of the cup 5ª, so as to permit fluid to pass freely into the cone. Positioned inside the cone may be a variety of filtering materials, such for example as a sponge 9ª, a layer of cotton 12, and a layer of felt 13, all as illustrated in Fig. 5.

In Fig. 4 still another modification is illustrated in that the end of the hose 3 is passed through an opening in a yoke or collar 15, from which extend three curved hook-like members 16, within which may be inserted a sponge 9ᵇ, to be held by the hooks in firm contact with the opening in the hose 8.

The practical nature, cheapness of construction, the simplicity and efficiency of operation, and the general utility of this device will be readily apparent to those familiar with the making of home beverages.

In Fig. 6 the device is illustrated as applied to a barrel or keg. Here the metal is compressed and held by pressure outward against the edges of the bung hole instead of clamping on the jar wall.

I claim:

1. A device for drawing off liquids from containers, comprising a one-piece resilient metal clamp member having a bend forming a loop at its top adapted to clamp thereby the edge of a jar or other liquid container, the other end of the clamp member being adapted to extend downward into the container and to support at its terminal a strainer device, and means on the clamp to retain a flexible hose associated therewith.

2. A draw-off device comprising in combination, a metal one-piece support, comprising a loop at one end adapted to engage the wall of a container, an extended portion beyond said loop adapted to lie inside the container, a cup adapted to retain a strainer attached to the lower end of the support, and means on the support to retain a hose extending from said cup around the loop in the support.

In testimony whereof, I sign my name.

HARRISON D. STERRICK.